United States Patent
Butler et al.

(10) Patent No.: US 6,558,788 B1
(45) Date of Patent: May 6, 2003

(54) HOLOGRAPHIC TRANSFER FILM

(75) Inventors: Michael D. Butler, North Andover, MA (US); Shailesh Chunilal Patel, Terre Haute, IN (US)

(73) Assignee: Applied Extrusion Technologies, Inc., New Castle, DE (US)

(*) Notice: Subject to any disclaimer, the term of this patent is extended or adjusted under 35 U.S.C. 154(b) by 28 days.

(21) Appl. No.: 09/627,977

(22) Filed: Jul. 28, 2000

Related U.S. Application Data

(60) Provisional application No. 60/147,122, filed on Aug. 4, 1999.

(51) Int. Cl.$^7$ .................... B32B 15/08; B32B 27/32
(52) U.S. Cl. ................. 428/336; 428/195; 428/201; 428/202; 428/209; 428/216; 428/461; 428/516
(58) Field of Search ................. 428/216, 336, 428/516, 195, 201, 202, 209, 461

(56) References Cited

U.S. PATENT DOCUMENTS

| | | | |
|---|---|---|---|
| 3,973,063 A | 8/1976 | Clayton | |
| 4,413,109 A | 11/1983 | Haas | |
| 4,870,122 A | 9/1989 | Lu | |
| 4,880,697 A | * 11/1989 | Caldwell et al. | 428/35.4 |
| 4,911,976 A | * 3/1990 | Park et al. | 428/216 |
| 4,921,749 A | * 5/1990 | Bossaert et al. | 428/216 |
| 4,961,992 A | 10/1990 | Balloni et al. | |
| 5,108,814 A | 4/1992 | Harp et al. | |
| 5,194,318 A | 3/1993 | Migliorini et al. | |
| 5,254,394 A | 10/1993 | Bothe et al. | |
| 5,478,643 A | 12/1995 | Peiffer et al. | |
| 5,501,905 A | 3/1996 | Krallmann et al. | |
| 5,618,369 A | 4/1997 | Peiffer et al. | |
| 5,662,986 A | 9/1997 | Stepanek | 428/195 |
| 5,735,989 A | 4/1998 | Stepanek | 156/237 |
| 5,746,865 A | 5/1998 | Stepanek | 156/233 |
| 5,766,734 A | 6/1998 | Stepanek | 428/195 |
| 5,871,608 A | 2/1999 | Stepanek | 156/233 |
| 5,900,095 A | 5/1999 | Stepanek | 156/230 |
| 5,902,436 A | 5/1999 | Stepanek | 156/233 |
| 5,922,455 A | 7/1999 | Stepanek | 428/332 |
| 6,391,425 B1 | 5/2002 | Migliorini et al. | |

OTHER PUBLICATIONS

Database WPI, Section Ch. Week 199413, Derwent Publications Ltd. London GB An 1994–106431 XP002152605 & JP 06 055834 A (Toppan Printing Company Ltd) Mar. 1, 1994 abstract.

* cited by examiner

*Primary Examiner*—D. S. Nakarani
(74) *Attorney, Agent, or Firm*—Caesar, Rivise, Bernstein, Cohen & Pokotilow, Ltd.

(57) ABSTRACT

A transfer film for holographic images is a multilayer structure including a core and at least one outer layer having a sufficient thickness for receiving a holographic image impressed into it. The outer layer is thinner than the core layer and is a propylene/ethylene random copolymer having a DSC melting point in excess of 120° C. and less than 143° C. The outer layer further includes an antistatic/release additive therein for permitting multiple releases of a metallized layer initially applied to the outer layer having the holographic image impressed into it, onto a surface of another substrate.

19 Claims, No Drawings

HOLOGRAPHIC TRANSFER FILM

RELATED APPLICATIONS

This is a utility application based upon provisional application Ser. No. 60/147,122, filed on Aug. 4, 1999, entitled HOLOGRAPHIC TRANSFER FILM. Applicants hereby claim the benefit of the filing date of the '122 provisional application for this utility application.

FIELD OF THE INVENTION

This invention relates generally to a transfer film, and more specifically to a unique transfer film for holographic images. More particularly, this invention relates a transfer film designed to receive a holographic image that is imparted to a subsequently applied metallized layer, and then permits the metallized layer with the holographic image therein to be transferred onto another substrate, to thereby provide the holographic image on that other substrate.

BACKGROUND OF INVENTION

The art of transferring a holographic image from one substrate to another is known, as is exemplified in U.S. Pat. Nos. 5,662,986; 5,735,989; 5,723,203; 5,746,865; 5,766,734; 5,871,608; 5,900,095 and 5,902,436. The subject matter of all of the aforementioned patents is incorporated herein by reference. All of the above-identified patents describe processes for transferring a holographic image from a transfer film to another substrate, but only generally disclose polymeric transfer films. In fact, all of the above-identified patents state that the transfer films "include many of the commonly available plastics, for example. These will include polyethylenes, polypropylenes, polyethylene terephthalates, among others, for example. These substrates are usually 0.5 to 4.0 mils in thickness."

It is known in the prior art to form multilayer polyolefin films including a central core and one or more outer functional layers, with one of said layers being a propylene/ethylene copolymer heat seal layer. These films have been determined to be unsatisfactory for use in achieving multiple transfers of embossed metallized layers from the multilayer film to another substrate.

Although it also is known in the prior art to include additives, such as glycerol monostearate (GMS) and ethoxylated stearylamine in polyolefin films to provide a smooth surfaced, or non-holographic release film, this technology has not been employed or utilized in connection with any transfer films employed to achieve one or more transfers of a holographic image to another substrate.

Accordingly, a need exists for an improved transfer film for holographic images, which permits multiple transfers of the image to another substrate without unacceptable degradation of the holographic image. It is to such an improved transfer film that the present invention relates.

OBJECTS OF THE INVENTION

It is a general object of this invention to provide a transfer film for holographic images that is reliable in use.

It is a further object of this invention to provide a transfer film for holographic images that permits multiple transfers to be achieved in a reliable manner.

It is a further object of this invention to provide a transfer film for holographic images that permits multiple transfers of the image to another substrate, such as a thin tissue paper substrate, a foil substrate, a board stock or other desired substrate.

It is a more specific object of this invention to provide a transfer film that permits the multiple transfer of holographic images to a packaging substrate, such as a substrate employed to package food products.

It is a further object of this invention to provide a holographic transfer film for use in transferring a holographic image to a substrate of the type that generally is not capable of directly receiving a holographic image impressed into it, e.g., thin tissue paper, which is too flimsy and thin to directly receive a holographic image impressed directly into it.

It is a further object of this invention to provide a transfer film for holographic images that can be employed to transfer the holographic image to a substrate in a manner that does not undesirably modify the properties of the substrate.

SUMMARY OF THE INVENTION

The above and other objects of this invention are achieved in a transfer film for holographic images wherein the film is a multilayer structure including a core and at least one outer layer having a sufficient thickness for receiving a holographic image impressed into it. The outer layer for receiving the holographic image is thinner than the core layer and is a propylene/ethylene random copolymer having a DSC melting point in excess of 120° C. and less than 140° C. The outer layer further includes an antistatic/release additive in it for permitting multiple releases of a metallized layer that initially is applied to the outer layer of the transfer film having the holographic image impressed into it, onto a surface of another substrate.

In a preferred embodiment of this invention both the core and the outer layer for receiving the holographic image include an antistatic/release additive.

In a preferred embodiment of this invention the core is a polypropylene homopolymer.

In a preferred embodiment of this invention the outer layer is at least as thick as the depth of the holographic image impressed into it; most preferably in the range of 4–8 gauge.

In a preferred embodiment of this invention the outer layer has a thickness in excess of 6 gauge, and more preferably approximately 6.5 gauge.

In a preferred embodiment of this invention the release additive, which is in either the outer layer, or in both the outer layer and the core layer includes glycerol monostearate and ethoxylated stearylamine.

In a preferred embodiment of this invention the DSC melting point of the outer layer is in the range of 130° C. to 140° C., and more preferably approximately 134° C.

In certain embodiments of this invention, the transfer film is a multilayer structure including a core and opposed outer layers on opposite sides of the core. In these embodiments, one outer layer for receiving a holographic image impressed into it is thinner than the core layer and is a propylene/ethylene random copolymer having a DSC melting point in excess of 120° C. and less than 140° C., said one outer layer further including a release additive therein for permitting multiple releases of a metallized layer that initially is applied to the one outer layer of the transfer film having the holographic image impressed into it, onto a surface of another substrate.

In the preferred embodiments of this invention wherein the multilayer structure includes opposed outer layers, the outer layer opposed to the outer layer that receives the holographic image therein includes a slip agent in it.

Most preferably, when the multilayer structure includes opposed outer layers, the outer layer opposed to the one that receives the holographic image therein is treated to provide improved ink-receptivity and/or lamination properties; most preferably by either corona-treating or flame-treating that surface.

DETAILED DESCRIPTION OF THE PREFERRED EMBODIMENT

The preferred film of this invention is a biaxially oriented three layer product; preferably formed by a conventional coextrusion process. However, within the broadest aspects of this invention the film may be either cast or uniaxially oriented. The core preferably is an isotactic polypropylene homopolymer including antistatic/release additives therein. In the preferred embodiments of the invention these additives include glycerol monostearate (GMS) in the amount of approximately 3000 parts per million (ppm) and an ethoxylated stearylamine in the amount of approximately 1000 ppm. However, the types and amounts of antistatic/release additives may be varied in accordance with the broadest aspects of this invention; keeping in mind applicable FDA requirements for packaging materials intended for direct food contact. The core is the thickest component of the film, generally having a thickness in the range of 40–150 gauge, and more preferably in the range of 70–130 gauge (3.95 gauge=1 micron).

The transfer film of this invention includes an outer layer for receiving the etched, or holographic, image therein. Applicant has found that this layer must have certain very important properties in order to receive and retain the holographic image therein; receive a metallized layer thereon and then be capable of transferring the metallized layer with the holographic image impressed therein onto a receiving substrate, e.g., a thin tissue substrate, a foil substrate, a board stock, etc. Applicant has determined that a very desirable polymer composition for this outer layer is a propylene/ethylene random copolymer having a DSC melting point in excess of 120° C. and less than 143° C. All references to melting point herein refer to the DSC melting point. At a melting point of 120° C. and lower the polymer layer is too sticky, and at a melting point of 143° C. or higher the polymer is not soft enough to retain the embossed pattern therein. Preferably the propylene/ethylene copolymer has a melting point in the range of 130° C. to 140° C., and most preferably about 134° C. A preferred copolymer is Fina 8573, manufactured by Fina Oil and Chemical Company of La Porte Tex. This copolymer is a propylene/ethylene copolymer having approximately 4.5% ethylene in it and having a melting point of approximately 134° C. Another acceptable copolymer for use in forming the image-receiving layer is Exxon PD 9272, manufactured by Exxon Chemical Company of Baytown Tex. This copolymer is a propylene/ethylene copolymer having approximately 5% ethylene in it, and having a melting point of approximately 134° C.

Applicants also have determined that another critical feature of this invention is the thickness of the outer layer. In particular, the thickness needs to be at least as thick as, and preferably thicker than the depth of the hologram that is embossed into the surface. In a preferred form of invention the holographic image is impressed into the outer layer by directing the transfer film through an embossing or patterning nip provided between a smooth-surfaced rubber back up roll and a metal roll having the desired holographic image etched into it. In a preferred form of the invention the etched pattern is in the form of impressions that are approximately 1.5 microns deep and that are spaced apart from each other approximately 1 micron. In a preferred form of the invention the thickness of the outer film layer that receives the embossed pattern therein in 4–8 gauge; more preferably in excess of 6 gauge, and most preferably approximately 6.5 gauge. However the thickness of the hologram-receiving layer can be varied, depending upon the depth of the hologram to be impressed therein.

In the preferred embodiment of this invention, the propylene/ethylene copolymer layer for receiving the holographic image therein, like the core layer, also includes antistatic/release ingredients therein. In a preferred embodiment of this invention these latter ingredients are GMS in the amount of 5000 ppm and an ethoxylated stearylamine in the amount of 1100 ppm. However, the types and amounts of antistatic/release additives may be varied in accordance with the broadest aspects of this invention; keeping in mind applicable FDA requirements for packaging materials intended for direct food contact.

In the preferred embodiments of this invention the outer layer receiving the holographic image therein is neither corona nor flame treated, or for that matter treated in any other way that would enhance the adherence of the metal layer to the film surface. This is extremely important, since one of the critical properties of the film is that it be capable of transferring the metallized layer formed on it, along with the holographic image, to another substrate.

The opposed, or backside of the core layer preferably is a film having a thickness of about 5 gauge, and being formed of a propylene/ethylene copolymer (approximately 3% $C_2$) having a melting point of 143° C. A preferred copolymer for use as the backside film layer is Fina 7425, manufactured by Fina Oil and Chemical Company. The melting point of this backside layer is not critical, since the composition of the backside layer does not contribute in any way to the holographic transfer feature of the invention. However, in one preferred form of the invention the backside layer includes 2 micron cross-linked silicone particles in the amount of 3000 ppm. The silicone particles function as a slip agent to aid in the slitting operation so that the film can be effectively wound into a roll. Moreover, if desired this backside film layer can be corona or flame treated to improve its ink-receptive and lamination properties for receiving printed indicia and/or other bonding or adhesive media thereon. This renders the three-layer film suitable for reuse as a printed label, after it has been employed a desired number of times as a release film for transferring a holographic image to another substrate.

In use, the transfer films of this invention are packaged in roll form, and are then unwound and directed through a preheating station, and then through an embossing nip including a rubber backup roll and a metal embossing roll, that preferably is seamless, with the desired hologram etched therein. After embossing, the film is then metallized, e.g., by vacuum metallization, to thereby form a thin metal layer that conforms to the surface of the film, including the holographic image in said surface. Thereafter, a glue or other suitable adhesive preferably is applied to the substrate that is to receive the metallized layer from the transfer film, and the substrate and transfer film are laminated together. Thereafter the substrate and film are separated, and due to the fact that the metal layer has a greater affinity for the adhesive, or glue, on the surface of the substrate, the metal layer with the hologram therein is transferred from the transfer film to the substrate.

One reason for employing the transfer metallization process is because the tissue paper or other substrate intended to include the hologram in it often is too fine or flimsy to directly receive a vapor deposited metal layer on it. An additional benefit that is derived by forming the metal layer on the film, is that the film generally has a much smoother surface than the tissue paper or other substrate intended to receive the metal layer with the hologram. Thus, by employing the transfer films of this invention, the metallized film provides a smoother, higher gloss appearance than if it were formed directly on the rougher surface of the tissue paper or other substrate intended to receive the metallized film layer.

The films of this invention can be reused several times, and then the backside layer may be corona or flame treated and printed and/or laminated to be used in an entirely different application.

It should be noted that the use of a backside film layer, although preferred, is not required in accordance with the broadest aspects of this invention. In other words, if desired, the films of this invention can be of a two-layer construction including only the core layer and the outer film layer for receiving the holographic image therein.

Without further elaboration, the foregoing will so fully illustrate my invention that others may, by applying current or future knowledge, readily adopt the same for use under various conditions of service.

We claim:

1. A metallized holographic transfer film for holographic images, said film being a multilayer structure including at least two layers, one of said at least two layers being thinner than the other of said at least two layers and constituting an outer layer having a sufficient thickness for receiving a holographic image impressed into it, a holographic image impressed into said outer layer, said outer layer being a propylene/ethylene random copolymer having a DSC melting point in excess of 120° C. and less than 143° C., said outer layer with the holographic image pressed into it further including and antistatic/release additive therein and a metal layer releasably adhered thereon, said film permitting multiple releases of a metal layer releasably adhered to the outer layer having the holographic image impressed into it, onto a surface of another substrate.

2. The transfer film of claim 1, wherein the core includes an antistatic/release additive therein.

3. The transfer film of claim 2, wherein the antistatic/release additive in both the core and the outer layer includes glycerol monostearate and ethoxylated stearylamine.

4. The transfer film of claim 1, wherein the core is a polypropylene homopolymer including an antistatic/release additive therein.

5. The transfer film of claim 4, wherein the antistatic/release additive in both the core and the outer layer includes glycerol monostearate and ethoxylated stearylamine.

6. The transfer film of claim 1, wherein the outer layer is at least as thick as the depth of the holographic image impressed into said outer layer.

7. The transfer film of claim 1, wherein the outer layer has a thickness in the range of 4–8 gauge.

8. The transfer film of claim 7, wherein the outer layer has a thickness in excess of 6 gauge.

9. The transfer film of claim 7, wherein the outer layer has a thickness of approximately 6.5 gauge.

10. The transfer film of claim 1, wherein the antistatic/release additive includes glycerol monostearate and ethoxylated stearylamine.

11. The transfer film of claim 1, wherein the DSC melting point is in the range of 130° C. to 140° C.

12. The transfer film of claim 1, wherein the DSC melting point is approximately 134° C.

13. A holographic, metallized transfer film for holographic images, said film being a multilayer structure including a core and opposed outer layers on opposite sides of said core, one outer layer including a holographic image impressed into it and being thinner than said core layer and being a propylene/ethylene random copolymer have a DSC melting point in excess of 120° C. and less than 143° C., said one outer layer further including an antistatic/release additive therein and a metal layer releaseably adhered thereon for permitting multiple releases of metal layers releaseably adhered to the one outer layer having the holographic image impressed into it onto a surface of another substrate.

14. The transfer film of claim 13, wherein the outer layer opposed to said one outer layer includes a slip agent therein.

15. The transfer film of claim 13, wherein the outer layer opposed to said one outer layer has a thickness of about 5 gauge.

16. The transfer film of claim 13, wherein the outer layer opposed to said one outer layer is a propylene/ethylene copolymer.

17. The transfer film of claim 16, wherein the outer layer opposed to said one outer layer has a melting point of 143° C.

18. The transfer film of claim 13, wherein the outer layer opposed to said one outer layer is treated to provide improved ink-receptivity and lamination properties.

19. The transfer film of claim 18, wherein the outer layer opposed to said one outer layer is either corona treated or flame treated to improve the ink-receptivity and lamination properties of said treated layer.

* * * * *